United States Patent Office 3,669,632
Patented June 13, 1972

3,669,632
METHOD FOR THE PREPARATION OF SPHERICAL PARTICLES
Johannes B. W. Kanij, Zevenaar, and Arend J. Noothout, Oosterbeek, Netherlands, assignors to Reactor Centrum Nederland, The Hague, Netherlands
No Drawing. Filed Sept. 27, 1968, Ser. No. 763,390
Int. Cl. C01f 15/00
U.S. Cl. 23—345                        10 Claims

ABSTRACT OF THE DISCLOSURE

A method is disclosed of preparing spherical particles of actinide hydroxide gel, which particles can be converted by thermal treatment into spherical oxide, and if carbon has been incorporated into the gel, carbide particles.

Spherical actinide oxide and carbide particles are needed in nuclear technics.

An actinide hydroxide sol is mixed with a solution of one or more ammonium donors and subsequently gelled by dispersion into a hot liquid nonmiscible with water.

---

The invention relates to a method for the preparation of spherical particles of actinide hydroxide gel.

For the preparation of spherical particles of actinide gel according to so-called sol-gel processes, it has been found desirable to obtain very large gel particles of a size between 3 and 6 mm. which can be converted into spherical oxide particles. Indeed, in nuclear technics the need has arisen for large spherical particles of actinide oxide.

Particles of this diameter could not until recently be prepared according to the usual sol-gel methods.

The invention aims at providing a method of preparation for large actinide-gel particles.

According to the invention an actinide hydroxide sol is mixed at a temperature of 10° C. or lower with a solution of one or more ammonia donors. By ammonia donors is meant in this connection compounds which decompose in water and give off ammonia. Next, the sol is gelled by dispersion below the surface of a liquid non-miscible with water having a temperature between 80° and 95° C. The densities of the mixture of sol and ammonia donor and the liquid non-miscible with water should for this purpose range between 1.7 and 2.0 and between 1.4 and 1.6 respectively.

The liquid non-miscible with water should, moreover, have a fairly high interfacial tension with respect to water at the working temperature.

By fairly high interfacial tension with respect to water, applying here to actinide hydroxide sols, is meant in this connection a value higher than 30 dynes/cm.

A surface-active substance will not of course be used, as the required high interfacial tension with respect to water would thereby be nullified.

Suitable liquids non-miscible with water which satisfy the requirements of specific gravity and high interfacial tension with respect to water are, inter alia, tetrachloro-ethane and tetrachloro-ethylene (perchloroethylene).

Serviceable sols in view of the density requirements are actinide hydroxide sols which, after the addition of the gelling agent, contain a strength of actinide metal ranging between 1.7 and 2.1 mols per kg. of sol (mols/kg.).

The strength in mols/kg. indicated above for actinide hydroxide sols deviates from the usual indication in mols per litre, it being easier for analytical purposes to weigh out a certain weight than to measure out a certain volume.

It has been found that the pouring out of the sol drop by drop below the surface of the gelling liquid sol of a higher strength than that indicated above yields drops of too small a size and hence too small a particle-size.

A lower strength of concentration does yield larger drops, but the drops formed show a much greater shrinkage, as a result of which the required particle-size is still not obtained.

Solutions containing both hexamethylene-tetramine and urea are excellent ammonia donors.

Advantageous strengths of concentration of hexamethylene-tetramine and urea are strengths of both substances between 1 and 2 mols/litre.

It has been found that the combination of both these ammonia donors is required for obtaining both a sufficiently long keeping time of the sol after mixing and for obtaining sufficiently rapid gelling.

Large particles can be obtained straight away by adding 0.8 ml. of a solution of 1.5-molar strength of both hexamethylene-tetramine and urea for every 10 grams of an actinide sol with a strength of concentration of 2 mols/kg.

It has been found that when tetrachloro-ethylene is used as a gelling liquid a temperature between 88 and 90° C. is very highly conducive to gelling.

This may in some way be related to the existence of an azeotrope of tetrachloro-ethylene and water (composition 17.2 percent by weight of $H_2O$ and 82.8 percent by weight of $C_2Cl_4$, boiling point 88.5° C.).

By thermal treatment the particles of gel obtained can be converted into actinide oxide globules. It is possible to mix the sol with carbon before adding ammonia donor; in this way gel particles with a carbon content are obtained. Gel particles with a carbon content can be converted by thermal treatment into particles of actinide carbide.

Three examples are given below in which the invention is further elucidated.

Example I deals with the gelling of a mixed thorium-uranium hydroxide sol (86 mol percent of thorium and 14 mol percent of uranium$^{VI}$).

Example II deals with the gelling of a tetravalent uranium-hydroxide sol.

Example III deals with the gelling of a thorium-uranium hydroxide sol (86 mol percent of thorium and 14 mol percent of uranium$^{VI}$) with carbon.

EXAMPLE I

A quantity of 10 g. of thorium-uranium hydroxide sol (86 mol percent of thorium-14 mol percent of uranium$^{VI}$), strength of concentration 2 mols/kg., was cooled in ice, after which 0.8 ml. of a hexamethylene-tetramine-urea solution was added. The "hexa"-urea solution contained 216 grams of "hexa" and 88 grams of urea per litre.

The mixture of sol and ammonia donor solution was then dispersed below the liquid surface in the desired drop-distribution in a gelling vessel containing tetrachloro-ethylene of 90° C. Dispersion is preferably effected by pouring out drop by drop from sprayers.

The amount of sol which is mixed with this quantity of ammonia donor must be dispersed in tetrachloro-ethylene within 6 minutes. After a longer waiting time the mixture is too viscous, so that dispersion in drops becomes impossible.

After dispersion the outer skin of the drops is sufficiently hardened within 10 seconds to prevent the adhesion of the drops to each other.

For complete gelling a detention time of about 20 minutes at the given temperature is necessary.

The water expelled from the sol-drops during gelling, floated on the tetrachloro-ethylene (perchloroethylene)

layer, where it evaporated in the further course of the gelling process.

After gelling in the gelling vessel the gel globules obtained were removed from this vessel and, after being cooled to room temperature, were rinsed with $CCl_4$. After this the globules were washed out with an aqueous 1-molar ammonia solution; detention time in the ammonia solution about ½ hour.

After filtering off the globules were allowed to steam for an hour in air.

Finally, the globules were dried at 70° C. to a maximum humidity of about 2.5%.

EXAMPLE II

Instead of a mixed thorium-uranium hydroxide sol a tetravalent uranium-hydroxide sol, strength 2 mols/kg., was gelled in this case. The further reaction conditions were practically the same as in Example I.

EXAMPLE III

In addition to mixing carbon with the thorium-uranium hydroxide sol the reaction conditions were practically the same as in Example I with the exception of the required detention time for complete gelling and the maximum permissible humidity after drying.

For complete gelling in the case of a sol mixed with carbon a detention time of about 10 minutes is sufficient. The maximum permissible humidity is in this case about 3.5%.

A description is given below of the mixing of a thorium-uranium hydroxide sol with carbon.

A quantity of 100 grams of thorium-uranium hydroxide sol (86 mol percent of thorium and 14 mol percent of uranium$^{VI}$), strength 2 mols/kg., was mixed with 9.5 grams of carbon. In order to bring the final density for gelling to a value between 1.8 and 1.9 a quantity of 5 ml. of water was added. The mixture obtained was then shaken in a Turbula mixer shaking machine.

Restriction of the humidities is necessary in order to avoid faults such as cracks and fissures in the globules during a sintering treatment.

What is claimed is:

1. A method for the preparation of spherical particles of particles of actinide hydroxide gel comprising mixing an actinide hydroxide sol at a temperature of 10° C. or lower with a solution of at least one ammonia donor, subsequently gelling into the form of spherical particles of the mixture by dispersion in drops below the surface of an organic liquid non-miscible with water having a temperature between 80° and 95° C., the densities of the mixture of sol and ammonia donor and the organic liquid non-miscible with water ranging between 1.7 and 2.0 and between 1.4 and 1.6, respectively, and the organic liquid non-miscible with water having an interfacial tension with respect to water which at the working temperature is at least 30 dynes/cm., thereafter separating the gel particles from the organic liquid.

2. A method according to claim 1 wherein the organic liquid is selected from the group consisting of tetrachloro-ethane and tetrachloro-ethylene.

3. A method according to claim 1, whereby the actinide hydroxide sol after the addition of the gelling agent has a strength of actinide metal ranging between 1.7 and 2.1 mols/kg.

4. A method according to claim 1 wherein the ammonia donor is a mixed solution of hexamethylene-tetramine and urea.

5. A method according to claim 4 wherein the hexamethylene-tetramine and urea are in a concentration between 1 and 2 mols per litre.

6. A method according to claim 1 including the addition of 0.8 ml. of a solution of approximately 1.5 molar strength of both hexamethylene-tetramine and urea to every 10 grams of sol with a content of about 2 mols/kg. of actinide metal.

7. A method according to claim 1 wherein the organic liquid is tetrachloro-ethylene ($C_2Cl_4$) at a temperature between 88° and 90° C.

8. A method according to claim 1 including the mixing of carbon through the sol prior to the addition of ammonia donor.

9. A method according to claim 1 including the conversion into spherical actinide oxide particles by drying and heating the dry actinide hydroxide gel particles.

10. A method according to claim 8 including the conversion by heating of the carbon containing hydroxide particles into spherical actinide carbide particles.

References Cited

UNITED STATES PATENTS

| | | | |
|---|---|---|---|
| 3,290,122 | 12/1966 | Clinton et al. | 23—345 X |
| 3,310,386 | 3/1967 | Lloyd | 252—301.1 X |
| 3,312,631 | 4/1967 | Smith | 23—345 X |
| 3,312,632 | 4/1967 | Smith | 23—345 X |
| 3,409,557 | 11/1968 | Fitch et al. | 252—301.1 |
| 3,422,167 | 1/1969 | Bowman et al. | 23—345 X |

CARL D. QUARFORTH, Primary Examiner

S. J. LECHERT, JR., Assistant Examiner

U.S. Cl. X.R.

23—349, 254, 255; 252—301.1; 264—.5

UNITED STATES PATENT OFFICE
CERTIFICATE OF CORRECTION

Patent No. 3669632  Dated June 13, 1972

Inventor(s) Johannes B.W. KANIJ and Arend J. NOOTHOUT

It is certified that error appears in the above-identified patent and that said Letters Patent are hereby corrected as shown below:

Add to the form:

--- Applicants claim priority Netherlands application Serial No. 6713249, filed September 29, 1967. ---

Signed and sealed this 31st day of October 1972.

(SEAL)
Attest:

EDWARD M. FLETCHER, JR.
Attesting Officer

ROBERT GOTTSCHALK
Commissioner of Patents